United States Patent [19]

Yamaguchi

[11] Patent Number: 5,130,801
[45] Date of Patent: Jul. 14, 1992

[54] IMAGE SUPERIMPOSING APPARATUS HAVING LIMITED MEMORY REQUIREMENT

[75] Inventor: Masakazu Yamaguchi, Kawasaki, Japan

[73] Assignee: Fujitsu Limited, Kawasaki, Japan

[21] Appl. No.: 571,189

[22] Filed: Aug. 23, 1990

[30] Foreign Application Priority Data

Aug. 23, 1989 [JP] Japan .................................. 1-216888

[51] Int. Cl.⁵ .......................... H04N 7/15; H04N 5/262
[52] U.S. Cl. ....................................... 358/183; 358/85; 379/53
[58] Field of Search ................... 358/22, 183, 182, 85; 379/53, 54

[56] References Cited

U.S. PATENT DOCUMENTS

| | | | |
|---|---|---|---|
| 4,249,213 | 2/1981 | Imaide et al. | 358/183 |
| 4,465,670 | 10/1990 | Klinefelter | 358/183 |
| 4,602,286 | 7/1986 | Kellar et al. | 358/183 |
| 4,698,682 | 10/1987 | Astle | 358/182 |
| 4,743,970 | 5/1988 | Barnett et al. | 358/183 |
| 4,758,881 | 7/1988 | Lapsada | 358/85 |
| 4,796,089 | 1/1989 | Imai et al. | 358/182 |
| 4,811,103 | 3/1989 | Casey | 358/22 |
| 4,907,086 | 3/1990 | Truong | 358/183 |
| 4,908,700 | 3/1990 | Ishii et al. | 358/183 |
| 4,979,028 | 12/1990 | Minematsu et al. | 358/85 |
| 5,010,406 | 4/1991 | Kawakami et al. | 358/183 |
| 5,046,080 | 9/1991 | Lee et al. | 379/53 |
| 5,068,650 | 11/1991 | Fernandez et al. | 358/183 |

FOREIGN PATENT DOCUMENTS

| | | |
|---|---|---|
| 108691 | 2/1987 | Japan . |
| 226783 | 5/1987 | Japan . |
| 200888 | 7/1987 | Japan . |
| 85689 | 3/1988 | Japan . |
| 0029089 | 1/1990 | Japan . |
| 0082769 | 3/1990 | Japan . |
| 0125588 | 5/1990 | Japan . |
| 0127879 | 5/1990 | Japan . |

Primary Examiner—James J. Groody
Assistant Examiner—Jeffrey S. Murrell
Attorney, Agent, or Firm—Staas & Halsey

[57] ABSTRACT

Apparatus for superimposing a plurality of images to form one image for display includes an operation circuit for obtaining image data related to a next frame based on image data related to a present frame and differential image data of a plurality of images. A memory includes first and second banks, each having a memory capacity for storing at least one frame of image data. An address generator generates a display address which is used to make access to the first and second memory banks when reading image data for display. A display controller stores display image numbers which distinguish the plurality of images in correspondence with regions of each of the first and second banks, and a bank controller stores bank numbers of the first and second banks in correspondence with the display image numbers to indicate the bank from which the image data is presently being read out for display. The bank controller outputs a bank number in response to the display image number from the display controller, and the display address from the address generator and the bank number of the bank controller designate one of the first and second banks and its region from which the image data is to be read out for display.

13 Claims, 5 Drawing Sheets

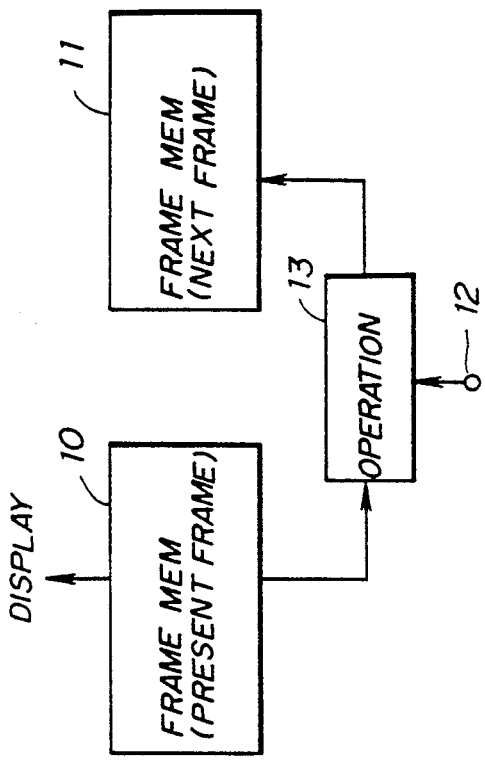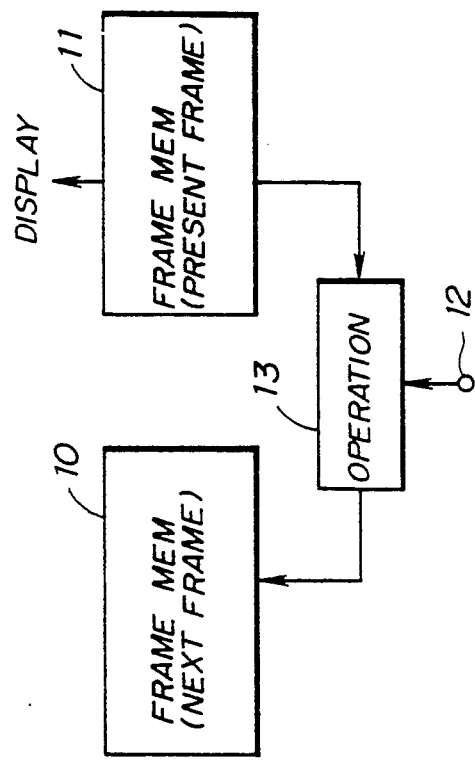
FIG.1A PRIOR ART
FIG.1B PRIOR ART

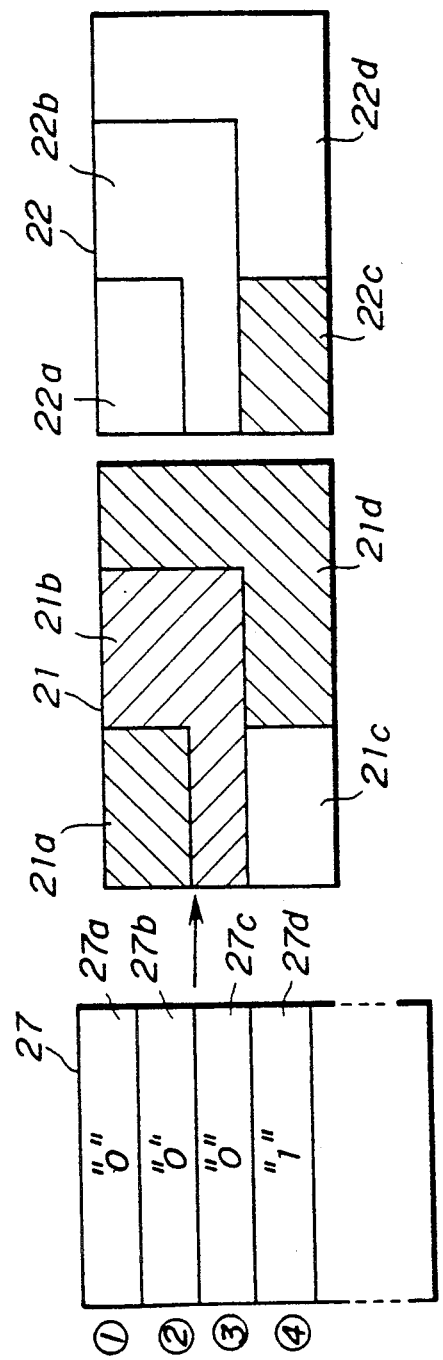

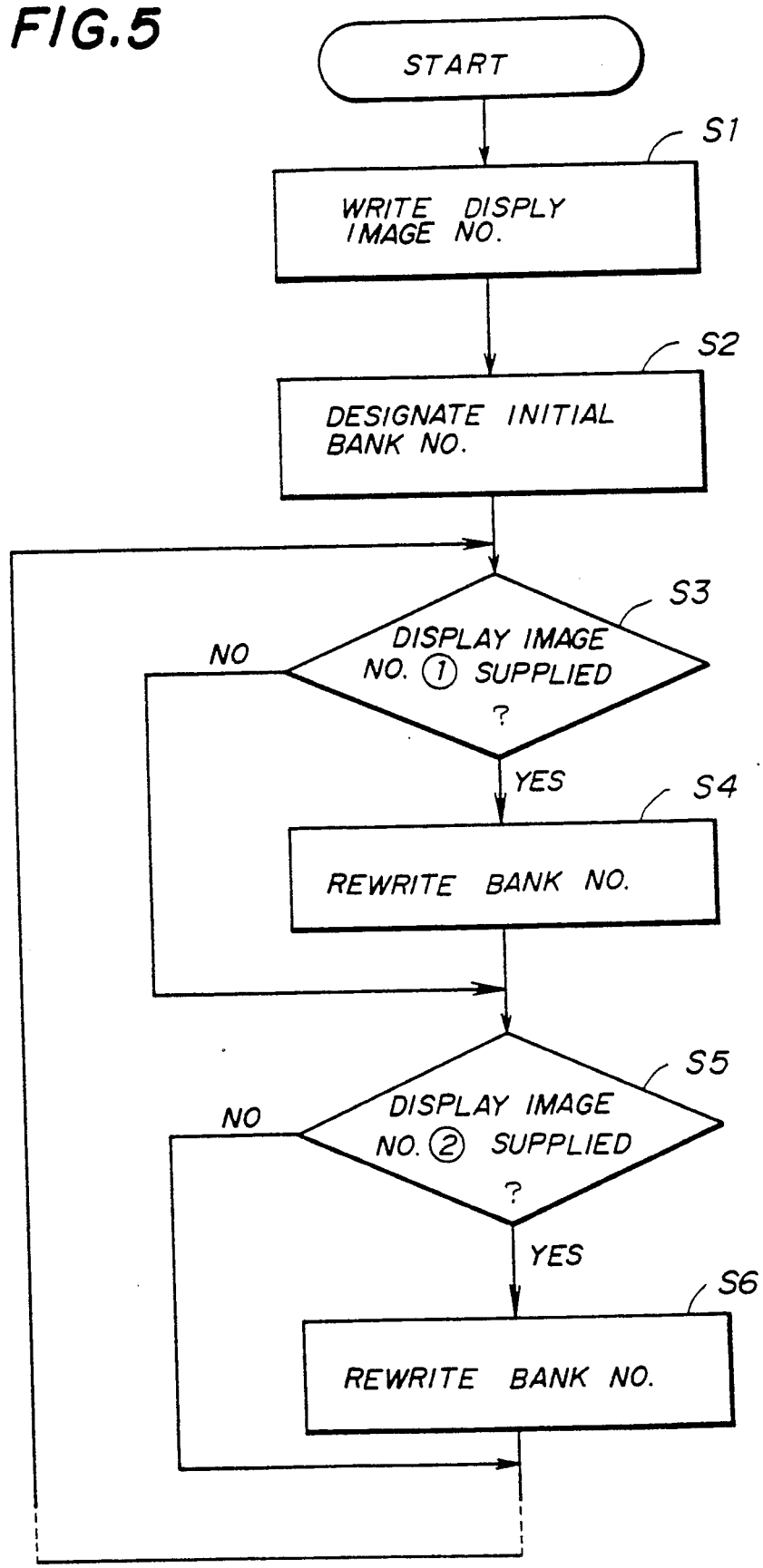

IMAGE SUPERIMPOSING APPARATUS HAVING LIMITED MEMORY REQUIREMENT

BACKGROUND OF THE INVENTION

The present invention generally relates to image superimposing apparatuses, and more particularly to an image superimposing apparatus which superimposes a plurality of images to form one image for display.

In a video conference system, for example, a so-called interframe differential system is used for transmitting the image. According to the interframe differential system, differential data are obtained from differential components between frames of the image and transmitted. The original image is reproduced and displayed from the differential data.

The interframe differential system will be described in conjunction with FIGS. 1A and 1B. As shown in FIG. 1A, the image superimposing apparatus is provided with two frame memories 10 and 11 and an operation circuit 13. The operation circuit 13 adds the image data which is read out from the frame memory 10 which is supplying the image data for display on a display device (not shown) and the differential image data which is received via a terminal 12. The image data which is obtained by the addition and is related to the next frame is written into the frame memory 11. Next, as shown in FIG. 1B, the image data read out from the frame memory 11 is supplied to the display device for display, and the image data which is related to the next frame and is obtained in the operation circuit 13 similarly as described above is written into the frame memory 10.

Conventionally, the video conference system separates the portrait image which is related to a person and includes large motion and the background image which is related to the background such as the conference room and includes only small motion. The two kinds of images are transmitted by taking the interframe differential components with a period dependent on the motion included in the images. FIG. 2 shows an example of a conventional image superimposing apparatus which is used for superimposing the two kinds of images.

In FIG. 2, the image data which is obtained in an operation circuit 13a based on the differential data of the background image received from a terminal 12a and the image data related to the present frame is alternately written into frame memories 10a and 11a. Similarly, the image data which is obtained in an operation circuit 13b based on the differential data of the portrait image received from a terminal 12b and the image data related to the present frame is alternately written into frame memories 10b and 11b.

The image data read out from the frame memories 11a and 10b in synchronism with each other are superimposed in a superimposing circuit 15 and supplied to a display device 16. Hence, an image in which a portrait image 16b is superimposed within a background image 16a is displayed on the display device 16.

According to the conventional image superimposing apparatus, however, it is necessary to provide two frame memories for each image which is to be superimposed on another image. For example, six frame memories are required when superimposing three images. For this reason, there is a problem in that the number of frame memories required increases as the number of images to be superimposed increases.

On the other hand, if the images were to be superimposed on the transmitting side and transmitted, the receiving side would only require two frame memories regardless of the number of images which are superimposed. However, it is impossible in this case to concentrate on the transmission of only the portrait image which includes large motion. In addition, it is impossible in this case to superimpose the images which are received from various locations of a multi-point video conference system into one image for display.

SUMMARY OF THE INVENTION

Accordingly, it is a general object of the present invention to provide a novel and useful image superimposing apparatus in which the problems described above are eliminated.

Another and more specific object of the present invention is to provide an image superimposing apparatus for superimposing a plurality of images into one image for display, comprising operation means for obtaining an image data related to a next frame based on an image data related to a present frame and a differential image data of a plurality of images, memory means coupled to the operation means including first and second banks each having a memory capacity for storing at least one frame of image data, address generating means coupled to the memory means for generating a display address which is used for making access to the first and second memory banks when reading image data for display, display control means coupled to the address generating means for storing display image numbers which distinguish the plurality of images in correspondence with regions of each of the first and second banks, where the display control means outputs a display image number in response to the display address from the address generating means, and bank control means coupled to the display control means for storing bank numbers of the first and second banks in correspondence with the display image numbers to indicate the bank from which the image data is presently being read out for display. The bank control means outputs a bank number in response to the display image number from the display control means, and the display address from the address generating means and the bank number of the bank control means designate one of the first and second banks and its region from which the image data is to be read out for display. According to the image superimposing apparatus of the present invention, it is possible to transmit each image depending on the motion included therein. Further, it is possible to superimpose a large number of images by the use of the memory means which may only have a minimum storage capacity of two frames. As a result, the image superimposing apparatus has a simple circuit structure and is inexpensive.

Other objects and further features of the present invention will be apparent from the following detailed description when read in conjunction with the accompanying drawings.

BRIEF DESCRIPTION OF THE DRAWINGS

FIGS. 1A and 1B are system block diagrams for explaining the interframe differential system;

FIG. 4 is a diagram for explaining a bank table and the utilization of banks; and FIG. 5 is a flow chart for explaining an operation of a write controller shown in FIG. 3.

DESCRIPTION OF THE PREFERRED EMBODIMENTS

Figure 2:
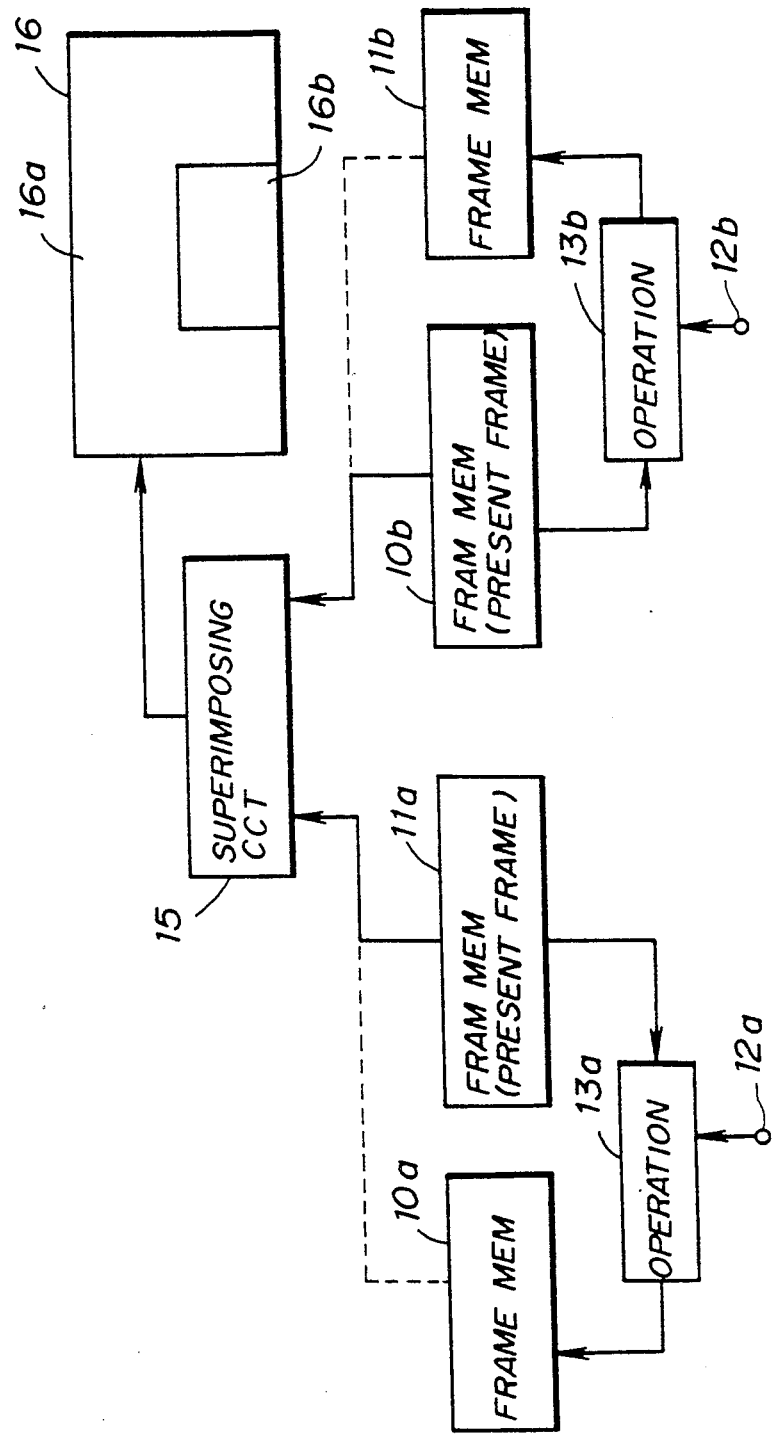
FIG. 2 is a system block diagram showing an example of a conventional image superimposing apparatus.
Figure 3:
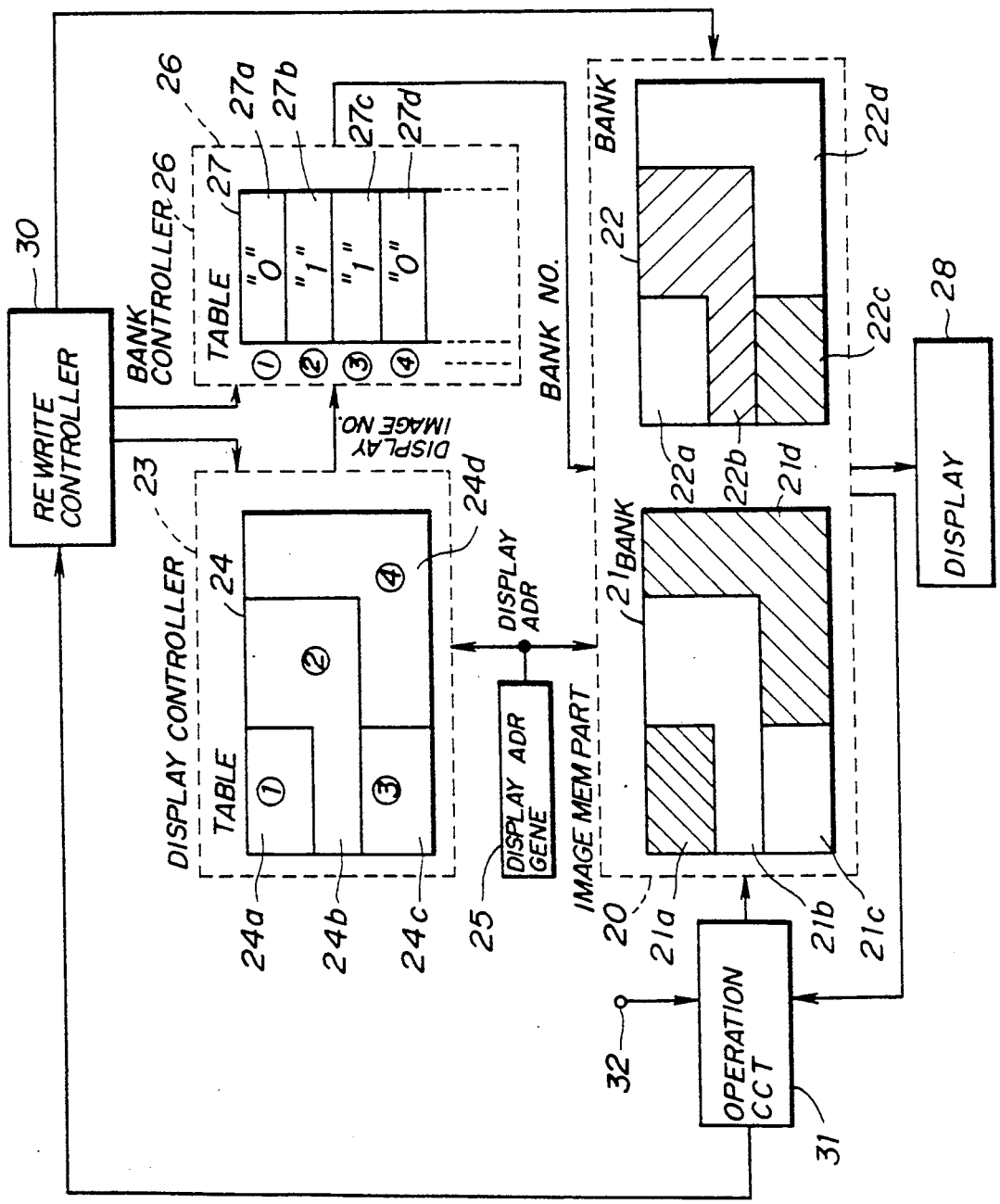
FIG. 3 is a system block diagram showing an embodiment of an image superimposing apparatus according to the present invention.

FIG. 3 shows an embodiment of an image superimposing apparatus according to the present invention. The image superimposing apparatus generally includes an image memory part 20, a display controller 23, a display address generator 25, a bank controller 26, a write controller 30 and an operation circuit 31. The image memory part 20 is made up of two banks 21 and 22. The display controller 23 includes a display region table, and the bank controller 26 includes a bank table 27. The image superimposing apparatus is coupled to a display device 28.

The banks 21 and 22 of the image memory part 20 respectively have a memory capacity sufficient to store image data amounting to one frame. The banks 21 and 22 are respectively designated by a 1-bit bank number, and an n-bit address designates the addresses of the image data within each bank.

An access is made to the display region table 24 of the display controller 23 by an n-bit address, similarly as in the case of the banks 21 and 22. At each address of the display region table 24, there is stored a display image number which designates the image to be displayed in the region.

The display address generator 25 successively generates an n-bit display address for reading out the image data from the bank 21 or 22 in order to display the image on the display device 28. This n-bit display address from the display address generator 25 is supplied to both the image memory part 21 and the display controller 23. The display image number which is read out from the display region table 24 based on the n-bit display address is supplied to the bank controller 26.

The table elements making up the bank table 27 of the bank controller 26 correspond to the display image numbers. Each table element stores a 1-bit bank number "0" or "1" which designates whether the image data which is presently being displayed is read out from the bank 21 or 22. The bank number which is read out from the table element corresponding to the display image number which is received from the display controller 23 is supplied to the image memory part 20.

The access to the image memory part 20 is made based on the bank number which is received from the bank controller 26 and the display address which is received from the display address generator 25, and the image data read out from the designated bank 21 or 22 of the image memory part 20 is supplied to the display device 28 to be displayed thereon.

In FIG. 3, the image which is displayed on the display device 28 is divided into four regions 24a through 24d of the display region table 24 which respectively correspond to the display image numbers ① through ④. The bank numbers which are stored in table elements 27a through 27d of the bank table 27 and respectively correspond to the display image numbers ① through ④ are "0", "1", "1" and "0". Hence, the image is displayed on the display device 28 based on the image data read out from regions 21a and 21d of the bank 21 indicated by the hatchings and regions 22b and 22c of the bank 22 indicated by the hatchings.

The write controller (also referred to as a rewrite controller) 30 re the display image number of the display region table 24 and also rewrites the bank number in each table element of the bank table 27. The rewriting of the bank number is carried out with respect to the table element corresponding to the display image number when the differential image data of the image corresponding to that display image number is received from a terminal 32. The rewrite controller 30 is informed of the receipt of the differential image data of the image corresponding to a display image number at the terminal 32 based on a signal which is received from the operation circuit 31. In addition, the write controller 30 supplies to the image memory part 20 the rewriting address of the image data which is to be rewritten within the image memory part 20 when the differential image data is received from the terminal 32. Accordingly, the image data read out from the rewriting address of one of regions 21b, 21c, 22a and 22d in the banks 21 and 22 of the image memory part 20 is supplied to the operation circuit 31 where the image data is added with the differential image data from the terminal 32 to generate a new image data. This new image data is rewritten into the rewriting address of one of the regions 21b, 21c, 22a and 22d in the banks 21 and 22 of the image memory part 20. In other words, the image data read from the image memory part 20 is supplied to the operation circuit 31 as the image data related to the present frame, and the new image data from the operation circuit 31 is written into the image memory part 20 as the image data related to the next frame.

When carrying out the rewriting of the image corresponding to the display image number ② in the displaying state shown in FIG. 3, the rewrite controller 30 rewrites the bank number of the table element 27b to "0" as shown in FIG. 4. As a result, the image data in the regions 21a, 21b, 22c and 21d of the banks 21 and 22 indicated by the hatchings in FIG. 4 are successively read out and displayed on the display device 28.

FIG. 5 is a flow chart for explaining the operation of the rewrite controller 30. In FIG. 5, a step S1 writes the display image numbers into the display region table 24 of the display controller 23. A step S2 designates the initial bank numbers in the bank table 27 of the bank controller 26. A step S3 judges whether or not the bank number corresponding to the display image number ① is supplied to the image memory part 20. When the judgement result in the step S3 is YES, a step S4 rewrites the bank number in the bank table 27 corresponding to the display image number ①. When the judgement result in the step S3 is NO or after the step S4, a step S5 judges whether or not the the bank number corresponding to the display image number ② is supplied to the image memory part 20. When the judgement result in the step S5 is YES, a step S6 rewrites the bank number in the bank table 27 corresponding to the display image number ②. Steps similar to the steps S3 and S4 are carried out thereafter for all display image numbers, that is, up to the display image number ④ in this embodiment. After the rewriting of the bank number in the bank table 27 corresponding to the display image number ④ ends, the process returns to the step S3.

Therefore, according to this embodiment, the access to the display region table 24 is made by the display address so as to obtain the display image number, and this display image number is used to obtain the bank number from the bank table 27 so as to determine whether the image data is to be read out from the bank 21 or 22. Between the two banks 21 and 22 respectively having the memory capacity amounting to at least one frame and less than two frames, it is possible to read out the image data from the region where no rewriting of the image data is carried out when superimposing a plurality of images for display on the display device 28. In addition, each image can be transmitted depending on the degree of motion therein and be written into the corresponding region of one of the two banks 21 and 22. Accordingly, it is possible to superimpose into one image the images received from a plurality of locations of a multi-point video conference system, for example, by use of only two banks 21 and 22 which together have a memory capacity amounting to a minimum of two frames, regardless of the number of images which are to be superimposed.

Of course, the present invention is not limited to the application to the multi-point video conference system and is similarly applicable to other systems which require superimposing of images. An example of such other systems, there is the security system which has a monitoring station for monitoring images received from a plurality of video cameras located at various check points. In this case, the present invention can be used to superimpose the images from the video cameras to form one image so as to facilitate the monitoring process.

Further, the present invention is not limited to these embodiments, but various variations and modifications may be made without departing from the scope of the present invention.

What is claimed is:

1. An image superimposing apparatus for superimposing a plurality of images to form one image for display, said image superimposing apparatus comprising:

operation means for obtaining next image data related to a next frame based on present image data related to a present frame and differential image data of a plurality of images;

memory means, coupled to said operation means to receive the next image data, said memory means including first and second banks each having regions and a memory capacity for storing at least one frame of image data, said memory means providing the present image data to said operation means;

address generating means, coupled to said memory means, for generating a display address which is used to access said first and second memory banks when reading image data from said memory means for display;

display control means, coupled to said address generating means, for storing display image numbers which distinguish the plurality of images in correspondence with the regions of each of said first and second banks, said display control means outputting a display image number in response to the display address from said address generating means; and bank control means, coupled to said display control means, for storing bank numbers of said first and second banks in correspondence with the display image numbers to indicate the one of said first and second banks from which the image data is presently being read out for display, said bank control means outputting a bank number in response to the display image number from said display control means, said display address from said address generating means and said bank number of said bank control means designating one of said first and second banks and its region from which the image data from said memory means is to be read out for display.

2. The image superimposing apparatus as claimed in claim 1, wherein said operation means receives the present image data read out from said memory means as the image data related to the present frame and supplies the next image data related to the next frame to said memory means.

3. The image superimposing apparatus as claimed in claim 2, wherein said operation means generates a rewrite signal and wherein said apparatus further comprises rewrite controller means, coupled to said operation means, for rewriting the bank number in said bank control means, for rewriting the bank number in said bank control means corresponding to the display image number from said display control means when the differential image data of the image corresponding to the display image number is received by said operation means, said rewrite controller means being informed of the receipt of the differential image data of the image corresponding to the display image number from said display control means based on the rewrite signal which is received from said operation means.

4. The image superimposing apparatus as claimed in claim 3, wherein said rewrite controller means supplies to said memory means a rewriting address of the next image data which is to be rewritten within said memory means when the differential image data is received by said operation means, so that the present image data read out from the rewriting address of one of the first and second banks of said memory means is supplied to said operation means which adds the present image data to the differential image data to generate the next image data related to the next frame, said next image data related to the next frame being rewritten into the writing address of said one of the first and second banks of said memory means, said rewriting address designating a region of said memory means other than a region from which image data is being read out for display.

5. The image superimposing apparatus as claimed in claim 3, wherein said rewrite controller means initially writes the display image numbers in said display control means.

6. The image superimposing apparatus as claimed in claim 3, wherein said rewrite controller means initially writes the bank numbers in said bank control means.

7. The image superimposing apparatus as claimed in claim 1, wherein said display control means includes a display region table which stores the display image numbers in a form of a table accessible by the display address.

8. The image superimposing apparatus as claimed in claim 1, wherein said bank control means includes a bank table which stores the bank numbers in a form of a table accessible by the display image number.

9. The image superimposing apparatus as claimed in claim 1, which further comprises display means coupled to said memory means for displaying the image data read out from said memory means, so that one image containing a plurality of superimposed images is displayed.

10. The image superimposing apparatus as claimed in claim 1, wherein said bank control means stores the bank numbers as 1-bit data.

11. The image superimposing apparatus as claimed in claim 1, wherein said first and second banks of said memory means each have a memory capacity amounting to at least one frame but less than two frames.

12. An image superimposing apparatus for superimposing at least three images to form a superimposed image for display, comprising:
- a first memory having at least three regions for storing image data corresponding to a respective at least three images, said first memory regions being combinable to form a first display image;
- a second memory having at least three regions for storing image data corresponding to a respective at least three images, said second memory regions being combinable to form a second display image;
- means for selectively combining image data from selected ones of said first and second memory regions to form a superimposed image for current display; and
- means for selectively rewriting the image data stored in said first and second memory regions which are not selected to form the superimposed image for current display.

13. A video conference system for receiving a plurality of images from remote locations and for generating a superimposed image for display, comprising:
- a first memory having at least three regions for storing image data corresponding to a respective at least three images from at least two remote locations, said first memory regions being combinable to form a first display image;
- a second memory having at least three regions for storing image data corresponding to a respective at least three images from the at least two remote locations, said second memory regions being combinable to form a second display image;
- means for selectively combining image data from selected ones of said first and second memory regions to form a superimposed image for current display;
- means for displaying the superimposed image; and
- means for selectively rewriting the image data stored in said first and second memory regions which are not selected to form the superimposed image for current display.

* * * * *

UNITED STATES PATENT AND TRADEMARK OFFICE
CERTIFICATE OF CORRECTION

PATENT NO. :   5,130,801
DATED      :   JULY 14, 1992
INVENTOR(S) :  MASAKAZU YAMAGUCHI

It is certified that error appears in the above-identified patent and that said Letters Patent is hereby corrected as shown below:

Col. 4,   line 2, "re" should be --rewrites--.

Col. 6,   line 18, "means, for rewriting the bank number in said" should be deleted;
          line 19, "bank control" should be deleted.

Signed and Sealed this

Twenty-fourth Day of August, 1993

Attest:

BRUCE LEHMAN

Attesting Officer    Commissioner of Patents and Trademarks